(12) United States Patent
Holmén

(10) Patent No.: US 7,094,146 B2
(45) Date of Patent: Aug. 22, 2006

(54) COMBINE CHAFF DISCHARGER

(75) Inventor: Bengt Holmén, Skara (SE)

(73) Assignee: Rekordverken Sweden AB, Kranum (SE)

( * ) Notice: Subject to any disclaimer, the term of this patent is extended or adjusted under 35 U.S.C. 154(b) by 0 days.

(21) Appl. No.: 10/505,970

(22) PCT Filed: Jan. 23, 2003

(86) PCT No.: PCT/SE03/00105

§ 371 (c)(1),
(2), (4) Date: Aug. 27, 2004

(87) PCT Pub. No.: WO03/071857

PCT Pub. Date: Sep. 4, 2003

(65) Prior Publication Data

US 2005/0124399 A1  Jun. 9, 2005

(30) Foreign Application Priority Data

Feb. 27, 2002 (SE) .................... 0200601

(51) Int. Cl.
*A01F 12/46* (2006.01)
(52) U.S. Cl. .................................... 460/111
(58) Field of Classification Search ................ 460/111, 460/119, 112, 901
See application file for complete search history.

(56) References Cited

U.S. PATENT DOCUMENTS

| | | | | |
|---|---|---|---|---|
| 2,849,118 A * | 8/1958 | Ashton | ...................... | 209/318 |
| 3,664,349 A * | 5/1972 | Quick | ...................... | 460/99 |
| 3,833,006 A * | 9/1974 | Temple | ...................... | 460/99 |
| 4,307,732 A * | 12/1981 | De Busscher et al. | ........ | 460/99 |
| 4,617,942 A | 10/1986 | Garner | | |
| 4,637,406 A * | 1/1987 | Guinn et al. | ................. | 460/112 |
| 4,917,652 A * | 4/1990 | Glaubitz et al. | ............. | 460/111 |
| 4,923,431 A * | 5/1990 | Miller et al. | ................. | 460/111 |
| 5,797,793 A * | 8/1998 | Matousek et al. | ........... | 460/111 |
| 5,833,533 A * | 11/1998 | Roberg | ....................... | 460/112 |
| 6,155,506 A * | 12/2000 | Loppoli | .................... | 241/186.3 |
| 6,406,368 B1 * | 6/2002 | Cruson et al. | .............. | 460/111 |
| 6,416,405 B1 * | 7/2002 | Niermann | ..................... | 460/79 |
| 6,547,169 B1 * | 4/2003 | Matousek et al. | ........... | 239/661 |
| 6,602,131 B1 * | 8/2003 | Wolters | ...................... | 460/111 |
| 6,634,448 B1 * | 10/2003 | Bland | ......................... | 180/68.1 |
| 6,656,038 B1 * | 12/2003 | Persson | ...................... | 460/112 |
| 6,685,558 B1 * | 2/2004 | Niermann et al. | ........... | 460/111 |
| 6,863,605 B1 * | 3/2005 | Gryspeerdt et al. | ......... | 460/111 |
| 6,881,145 B1 | 4/2005 | Holmen | | |

FOREIGN PATENT DOCUMENTS

| | | |
|---|---|---|
| EP | 0 357 090 A2 | 3/1990 |
| SE | 512 815 C2 | 5/2000 |
| SE | 0003842-2 | 4/2002 |
| WO | WO 90/08458 A1 | 8/1990 |

* cited by examiner

*Primary Examiner*—Árpád Fábián Kovács
(74) *Attorney, Agent, or Firm*—Harness, Dickey & Pierce, P.L.C.

(57) ABSTRACT

A chaff discharger with at least one radial fan wheel, rotatably mounted in a fan housing. The housing includes an end wall turned away from a sieving unit and a peripheral wall formed with at least one chaff discharge opening. A direction of rotation of the radial fan wheel is reversible so as to permit discharge of the chaff in different directions via the associated chaff discharge opening, depending on the fan wheel direction of rotation.

12 Claims, 9 Drawing Sheets

US 7,094,146 B2

COMBINE CHAFF DISCHARGER

TECHNICAL FIELD OF INVENTION

The present invention relates to a chaff discharger, which is intended for use in a combine harvester for discharge of chaff from a sieving unit on the combine, said chaff discharger being positioned downstream of the sieving unit and having at least one radial fan wheel, which is rotatably mounted in a fan housing, said housing having an end wall, which is turned away from the sieving unit and a peripheral wall, formed with at least one chaff discharge opening.

BACKGROUND OF THE INVENTION

In threshing operations carried out in combine harvesters, harvest residues are produced, normally consisting of chaff and straw from such crops as wheat, barley, oats and rye but also originating from different kinds of oil-producing plants and maize, sunflower and so on having comparatively large and stiff plant parts. For the sake of simplicity and clarity, the terms chaff and straw will, however, be used throughout.

Modern combine harvesters are becoming increasingly larger with increasingly wider cutting tables that are in themselves substantially wider than the combine itself. During the threshing operation considerable amounts of smoke and dust are generated around the combine, which is a serious problem as regards the combine drive motor and above all considering the substantial fire hazard involved. In order to minimise this hazard it important that the largest possible amounts of the harvest residues consisting of straw and chaff are spread as far as possible laterally and rearwards of the combine.

The chaff discharger connected to the combine sieving unit on the whole has the same width as the combine itself and conventionally it is designed to spread, following the threshing operation, the chaff laterally and rearwards across an area that essentially corresponds to the width of the cutting table. A straw chopper, usually a rotary cutter, which is connected to a straw shaker or threshing cylinder incorporated in the combine and which is located downstream of said drum, likewise has a width approximately equalling that of the combine itself, and conventionally it is designed to chop up the straw into smaller pieces after the threshing operation, and to spread the chopped straw across an area behind the combine that essentially equals the chaff spreading width. Following the spreading of the chaff and the chopped straw as indicated above, the chaff and the straw are as a rule ploughed down together into the ground.

If for various reasons it is not desired to chop the straw in the straw chopper but instead to deposit it in windrows on the ground behind the combine to be later collected, and preferably baled, for use for example as fodder, bedding material and the like, this could be effected with the aid of for example a deflector plate. In this case the deflector plate may be pivotal between a first position, wherein it closes an inlet to the straw-cutter housing to shunt the straw chopper and allow the unchopped straw to be windrowed, and a second position, wherein it exposes the inlet to allow chopping of the straw in the straw chopper and spreading of the chopped straw.

From SE-C2-512 815 is previously known a combine harvester of the type described above in general terms, the straw chopper of which is positioned downstream not only of the straw shaker unit or the threshing cylinder but also of the chaff discharger. In this case the deflector plate is disposed between the chaff spreader and the straw chopper and it is movable between the above two positions for windrowing and for chopping of the straw. Irrespective of the deflector plate position, the chaff discharge opening formed in the fan housing of the chaff discharger is arranged, by rotation of the fan housing, to be set in a first position, wherein the chaff is sspread across the ground, and a second position, wherein the chaff is mixed in with the unchopped straw.

When the chaff is to be mixed with the straw that is intended for windrowing, this operation is carried out with the deflector plate assuming its first position and the chaff discharge opening its second position, whereas on the other hand, when the chaff is to be mixed with the straw to be choppe, i.e. upstream of the straw chopper, this operation is carried out with the deflector plate and the chaff discharge opening assuming their respective second positions. To allow admixture of chaff into the straw in the latter situation, the deflector plate is formed with a chaff through-passage that may be opened and closed. The through-passage is open, when the deflector plate assumes its second position for chopping the straw, and is closed, when it assumes its first position for windrowing of the straw.

In some types of combine harvesters, various circumstances, such as lack of space or different structural or functional/technical solutions, make it very difficult or even impossible to so locate the chaff discharger that without problems the chaff may be mixed with or blown into the straw, to be chopped in the straw chopper, upstream of the latter.

Furthermore, in some cases, particularly when large volumes of chaff (and husks) are to be handled, it may be difficult satisfactorily and without unnecessary waste to blow the chaff through the open through-passage in the deflector plate to the straw chopper.

In addition, because the chaff is mixed into the straw to be chopped upstream of the straw chopper it may in some cases happen, for example when the volumes of straw and chaff are large or when the moisture contents of that material are high, that the straw chopper becomes overloaded or clogged. In turn, this may lead to impaired spreading of the chopped straw jointly with the at least partly chopped chaff and, if the worst comes to the worst, even to breakdown.

SE-A1-000382-2 disclosed a combine harvester, wherein a spreader formed with spreader wings for spreading the chopped straw across the ground is connected to the outlet of the straw chopper. In order to solve the problem outlined above, the chaff discharge opening in the fan housing of the chaff discharger is then arranged to be directed towards a first position, wherein the chaff may be blown into the spreader to be spread by the latter, and a second position for spreading the chaff laterally upstream of the spreader. Normally, setting the chaff discharge opening such that it is directed to either the first or the second position is effected by rotation of the fan housing, but alternatively it could be effected by forming the chaff discharger with a first outlet in the first position and a second outlet in the second position, both outlets-being openable and closable as desired for example with the aid of e.g. shutters or dampers.

Irrespective of the design of the combine harvester as discussed above or also corresponding combine types, setting or directing the chaff discharge opening between the first and second positions, respectively, by means of rotation of the chaff discharger fan housing require that the fan housing be controlled. If the housing is controlled manually, then the operator needs to leave the driver's cabin each time the fan housing is to be rotated, and walk to the chaff discharger at the rear end of the combine harvester and to return the cabin to continue the threshing operation. On the other hand, when the control is effected by electrical or hydraulic means or in some other way by means of controls installed in the driver's cabin, the operator need not leave the driver's cabin but on the other hand, rather expensive and complex installation of the controls in the cabin is required as also mounting of the drive means in the form of motors, valves and so on on the chaff discharger in order to rotate the associated fan housing, as well as operational lines/hoses/tubes extending between the driver's cabin and the chaff discharger.

OBJECT OF THE INVENTION

The main object of the subject invention is to provide a chaff discharger that does not have any of the disadvantages or drawbacks referred to above.

Another object of the invention is to allow the combine harvester operator, while taking into account among other things the fire hazards, the type of crop to be harvested, the moisture contents of the crop and what is to be done to the harvest residues, and so on, to choose/decide for himself whether the harvest residues (chaff and straw) are to be spread together or separately, irrespective of whether the straw is to be chopped or be deposited in windrows.

Yet another object of the invention is to make it possible to achieve this freedom of choice by technically and functionally simple and efficient means.

SUMMARY OF THE INVENTION

These and other objects of the invention are achieved in a manner that is as surprising as it is unique by allowing for the direction of rotation of the radial fan wheel to be reversible so as to permit discharge of the chaff in different directions via the associated chaff discharge opening, depending on the fan-wheel direction of rotation.

Owing to this arrangement, no complex and expensive drawing of lines between the driver's cabin and the chaff discharger need to be made, nor need any drive means, valves, et cetera be provided on the chaff discharger fan housing to rotate the housing between the two housing positions. In principle, all that is required is a simple operating line or the like extending between the driver's cabin and the chaff discharger to reverse the drive motor of the radial fan wheel.

BRIEF DESCRIPTION OF THE DRAWINGS

The invention will be described in the following in more detail with reference to the accompanying drawings, wherein.

DETAILED DESCRIPTION OF PREFERRED EMBODIMENTS

Figure 1:
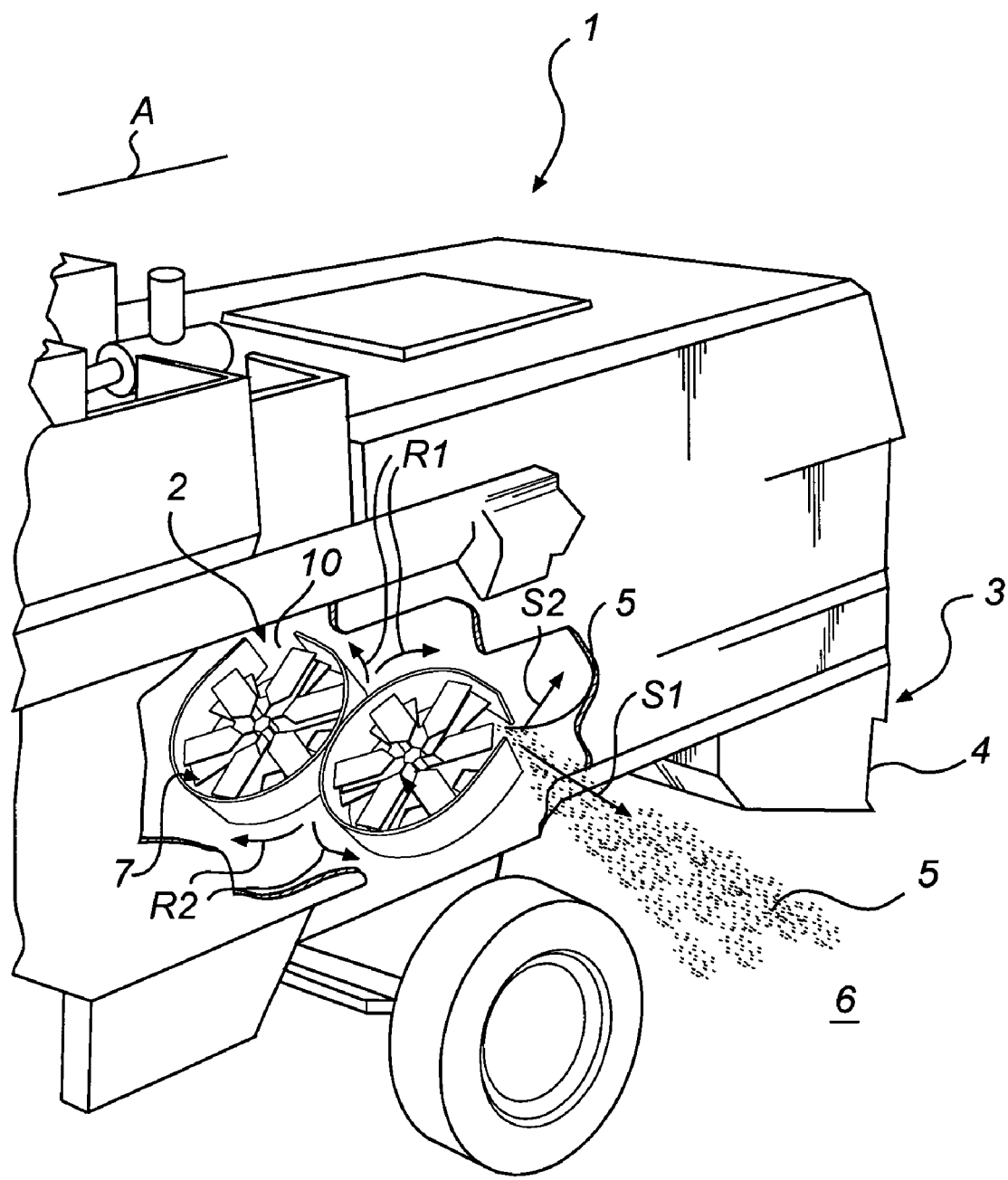
FIG. 1 is a schematic view as seen obliquely from the front of the rear part of a combine harvester equipped with the chaff discharger in accordance with the invention.
Figure 2:
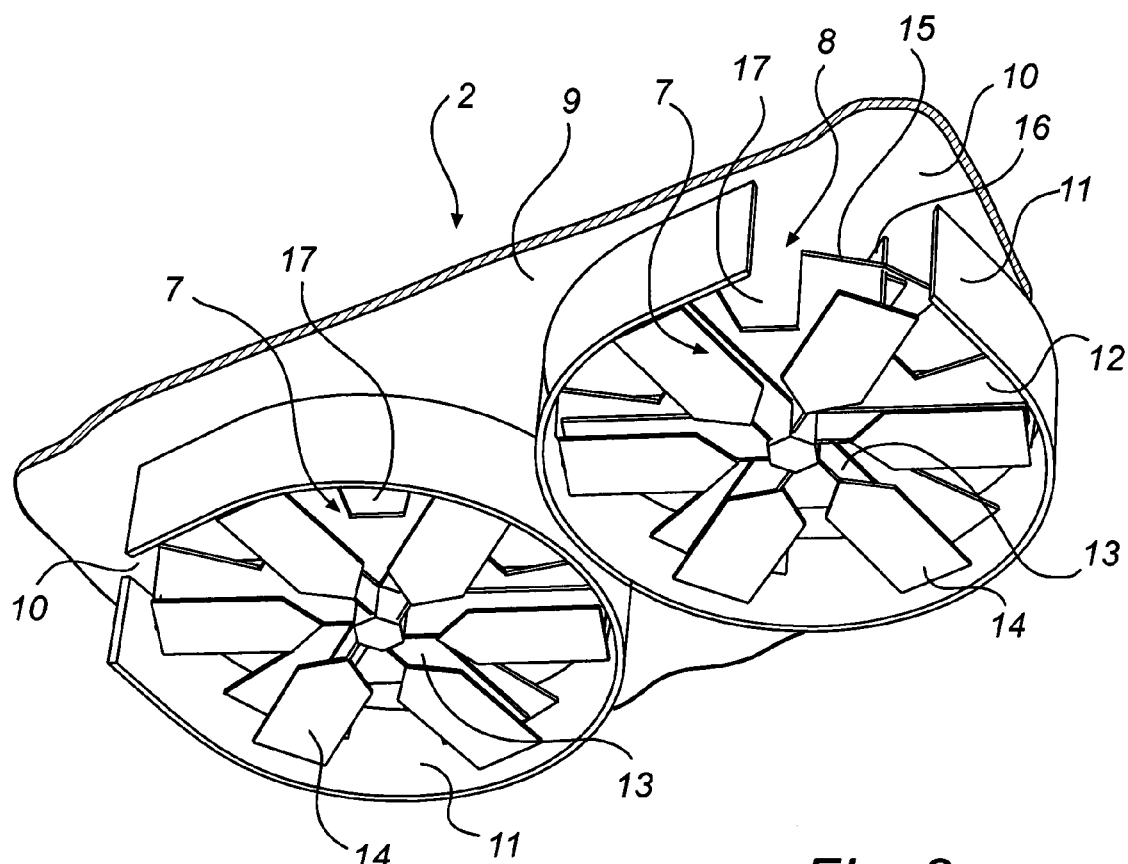
FIG. 2 shows the chaff discharger of FIG. 1 in closer detail.
Figure 3:
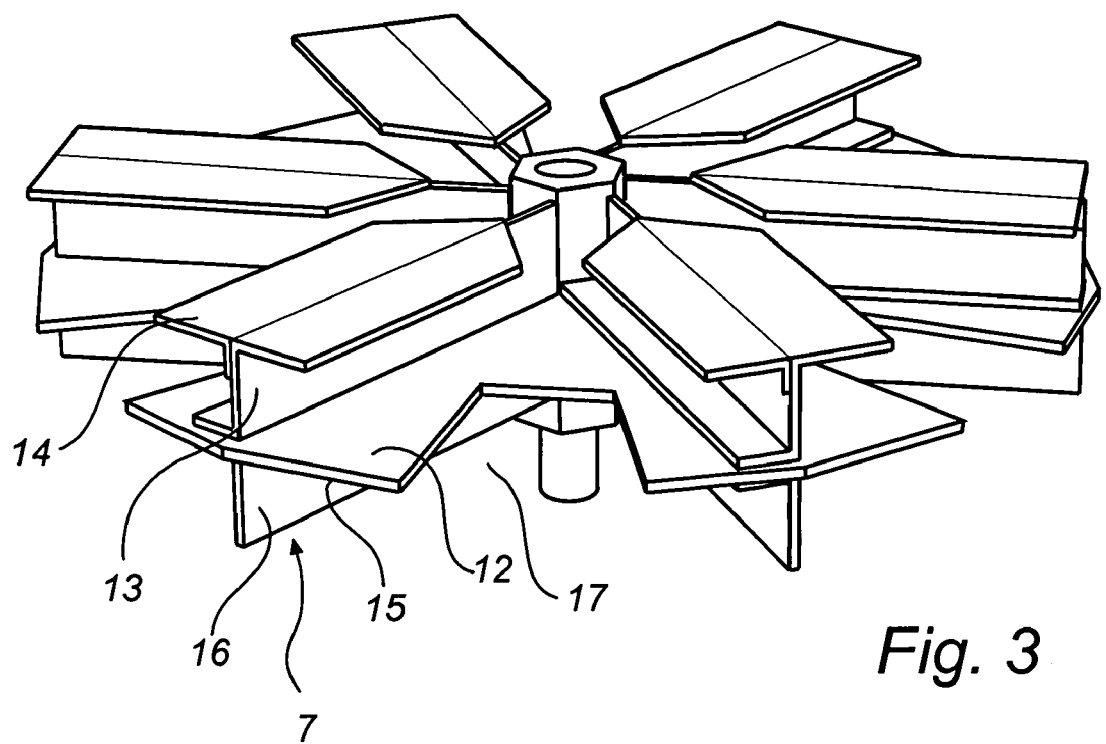
FIG. 3 is a perspective view as seen obliquely from above of a radial fan wheel incorporated in the chaff discharger of FIGS. 2 and 3.
Figure 4:
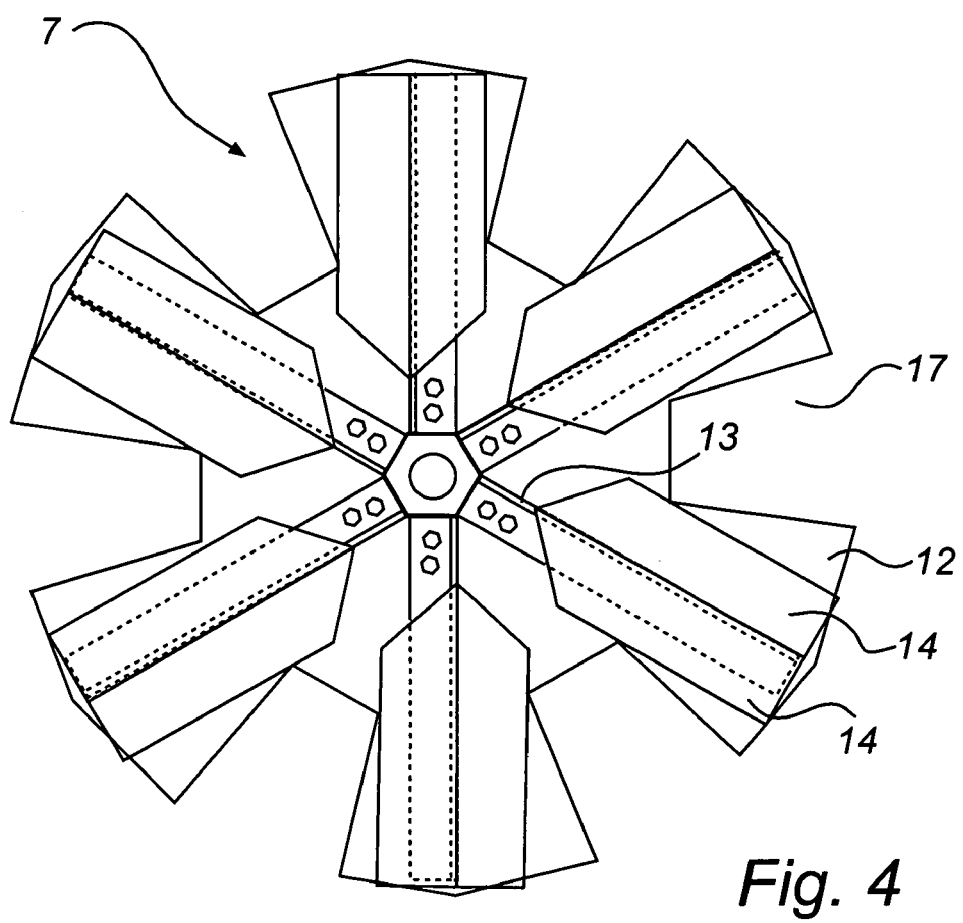
FIG. 4 is a view of the radial fan wheel of FIG. 3 in a view from above.
Figure 5:
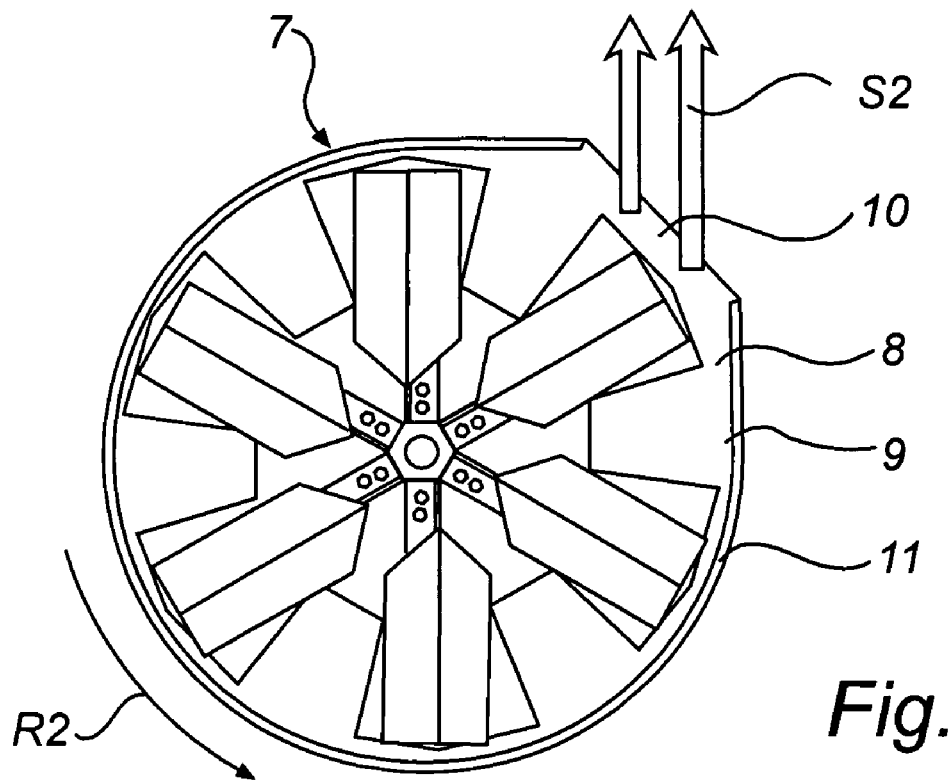
FIGS. 5 and 6 are views as seen from above of a first embodiment of the chaff discharger of the invention.
Figure 6:
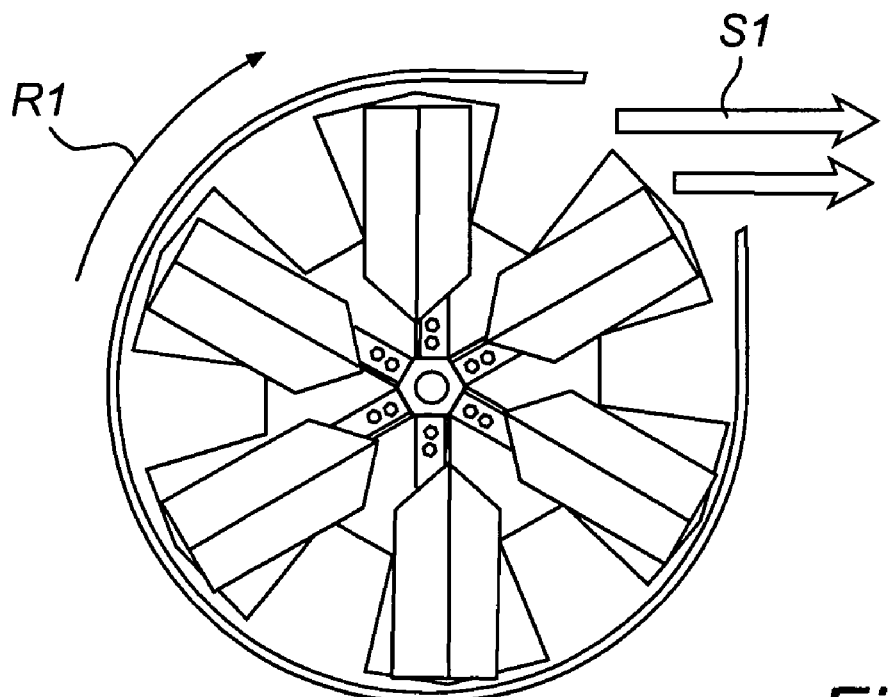

With the exception of the chaff discharger in accordance with the invention, generally designated by reference 2, the combine harvester generally designated in the drawings by reference 1 is of conventional design comprising a pick-up reel, not shown, and a cutting table, not shown either, which has a width considerably exceeding that of the combine harvester 1. The crop material, in this case straw fodder plants or the like that are to be harvested, is cut on the cutting table and is forwarded via conveyors or the like, not shown, to a thresher, not shown either, in which straw and grains are separated from one another, not shown.

The straw is forwarded via a conventional straw shaker, not shown, or alternatively a threshing cylinder or the like, to a straw chopper 3, which is located at the rear end of the combine harvester 1 as seen in the direction of travel A of the combine. Thus, the straw chopper is located downstream of the straw shaker and on the whole it is configured as a conventional rotary cutter. The straw chopper has an inlet, not shown, which faces the straw shaker for reception of the threshed but unchopped straw, and an outlet 4 for discharge of the chopped straw. Downstream of the straw chopper 3 a spreader, not shown, of a more or less conventional design usually is provided, serving to spread the chopped straw and/or chaff 5 across a ground 6, in this case in the form of a field.

The grains together with the chaff 5 (and husks) arriving from the thresher are forwarded to a sieving unit, not either shown in more detail, wherein the chaff is separated from the heavier grains and is carried away in the direction towards the outlet end of the sieving unit.

The above-mentioned chaff discharger 2 for discharge of chaff 7 from the sieving unit is located adjacent the outlet end. In accordance with the embodiment of the combine harvester 1 in accordance with FIG. 1, the chaff discharger 2 is mounted on the combine, preferably in a pivotable manner, essentially in the area underneath the straw chopper 3, and it may be fixed in the position shown in FIG. 1 and preferably in at least one further position, not shown, wherein it may be pivoted downwards or rearwards, for example for maintenance and servicing.

In accordance with the embodiments described and shown herein, the chaff discharger 2 comprises two disk-like radial fan wheels 7. Each radial fan wheel is reversible as to its direction of rotation as shown by arrows R1 and R2, preferably with the aid of an associated drive motor, not shown, and it is rotationally mounted either in a fan housing 8 that is common to the two wheels or in an individual fan housing, each housing having an end wall 9 facing away from the sieving unit and a curved peripheral wall 11, wherein is formed a chaff discharge opening 10. The number of radial fan wheels 7 may be varied according to wish. In the embodiments shown herein two such wheels are provided but the chaff discharger 2 could be fitted with one wheel only or with more than two.

Each radial fan wheel 7 is essentially flat and has an essentially circular profile configuration. On its face 12 turned towards the sieving unit, not shown, each wheel supports deflector blades 13 projecting from face 12. The number of such ejection blades may vary, but in accordance with the embodiment shown herein there are six ejection blades 13, which are evenly distributed along the face 12 of the fan wheel. The ejection blades may be mounted on said face in any desired manner, such as by means of bolts, welds, glue et cetera, and they extend upwards outwardly from the face 12. They are surmounted by catch flanges 14, which extend in both directions and in parallel with the plane of the radial fan wheel 7, and these flanges serve to bring along/convey the chaff 5 irrespectively of the direction of rotation of the radial fan wheel, towards the chaff discharge opening 10 for discharge of chaff in the desired direction.

On its opposite face 15 turned towards the end wall 9, the radial fan wheel 7 supports in a similar manner fan blades 16, which project from that face, essentially perpendicularly to the plane of the radial fan wheel and which may be mounted on said opposite face in a manner similar to that of the ejection blades 13. The number of fan blades may vary but in this case their number equals that of the ejection blades, i.e. six.

In addition, each radial fan wheel 7 is formed with through recesses 17 extending between the opposite wheel faces 12, 15, their purpose being to supply air from the face 12 turned towards the sieving unit to face 15 turned towards the end wall 9, and in doing so by means of on the one hand the ejection blades 13 and their associated catch flanges 14 and on the other the fan blades 16 throw/fling and blow, respectively, the chaff 5 towards the chaff discharge opening 10 for discharge through that opening.

Above or upstream of the straw chopper 3 a guide means in the form of a deflector plate, not shown, may be provided. By means of its lower end the deflector plate is pivotally mounted on the combine harvester 1. More precisely, the deflector plate normally is pivotal between a first position and a second position. In the first position, the deflector plate closes the inlet to the straw chopper 3 so as to bypass the straw chopper and allow windrowing of the unchopped straw. In the second position, on the other hand, the deflector plate exposes the same inlet to allow chopping of straw in the straw chopper 3 and spreading of the chopped straw via the outlet 4.

The spreader briefly referred to above and not described in any detail is of conventional design and serves to spread the chopped straw exiting from the outlet 4 of the straw chopper and/or spread the chaff 5 exiting from the chaff discharger unit 2 across the ground 6.

The chaff discharge opening 10 formed in the fan housing 8 of the chaff discharger 2 is directed in accordance with the embodiment of FIG. 1 essentially obliquely outwards to the sides and upwards. Upon rotation of the radial fan wheel 7 in one R1 of the directions of rotation chaff 5 is then discharged laterally to be spread across the ground 6 in the direction of arrow S1 whereas upon rotation of the radial fan wheel in the opposite reverse direction of rotation R2, the chaff is discharged to be admixed with the chaff in the unchopped straw.

If the chaff 5 is to be admixed with the straw to be windrowed, such admixture is carried out with the deflector plate described above assuming its first position, wherein it closes the inlet to the straw chopper 3 and with the radial fan wheel 7 rotating in the rotational direction R2.

If on the other hand the admixture of chaff 5 is to be into the straw that is to be chopped in the straw chopper 3, the admixture is carried out with the deflector plate 23 assuming its second position and with the radial fan wheel still rotating in rotational direction R2, the chaff 5 thus being chopped and spread together with the chopped straw.

When, as shown in FIG. 1, two chaff discharge openings 10 are provided it is of course possible by rotating one radial fan wheel 7 in one of the directions R1 or R2 and the other wheel in the opposite direction R2 or R1, to discharge part of the chaff 5 for spreading across the ground and to discharge the rest of the chaff for admixture into the straw to be windrowed without being chopped or to be chopped and spread. Further combination possibilities exist.

In accordance with one alternative embodiment, not shown in detail, of the combine harvester 1, which is fitted with a spreader connected to the outlet 4 of the straw chopper 3, the discharge opening 10 formed in the fan housing 8 of the chaff discharger 2 may be directed essentially obliquely outwards towards the sides, as previously described, and upwards towards the spreader. Upon rotation of the radial fan wheel 7 in one R1 of the directions of rotation chaff 5 is discharged laterally exactly like before to be spread across the ground 6 whereas upon rotation of the radial wheel in the opposite rotational direction R2 chaff is discharged so as to be blown into the spreader.

Figure 7:
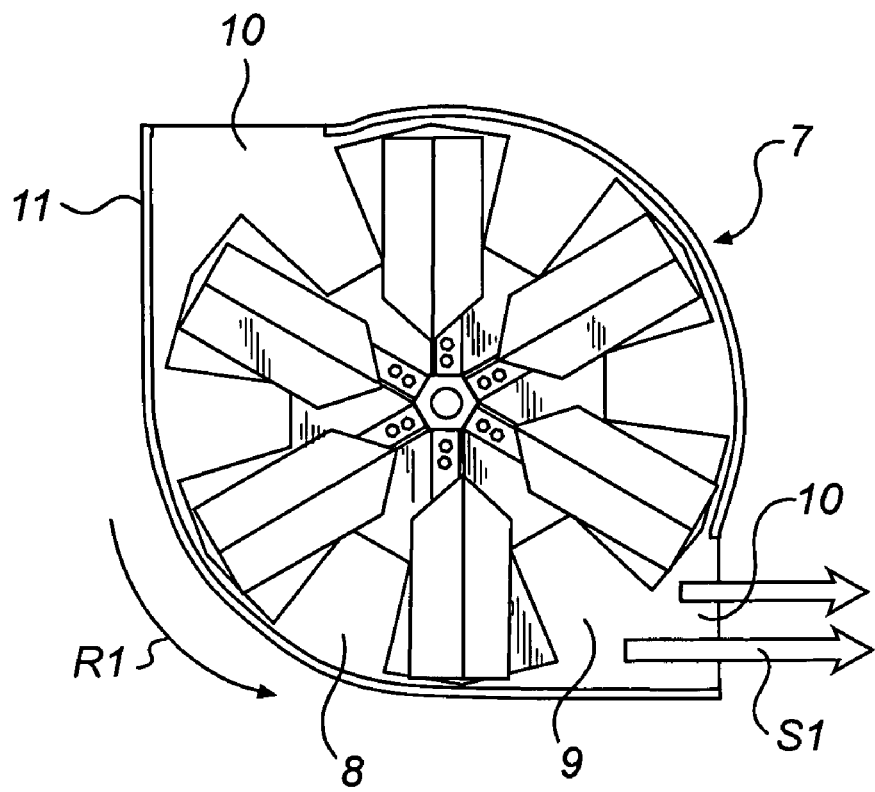
FIGS. 7 and 8 are views as seen from above of a second embodiment of the chaff discharger of the invention.
Figure 8:
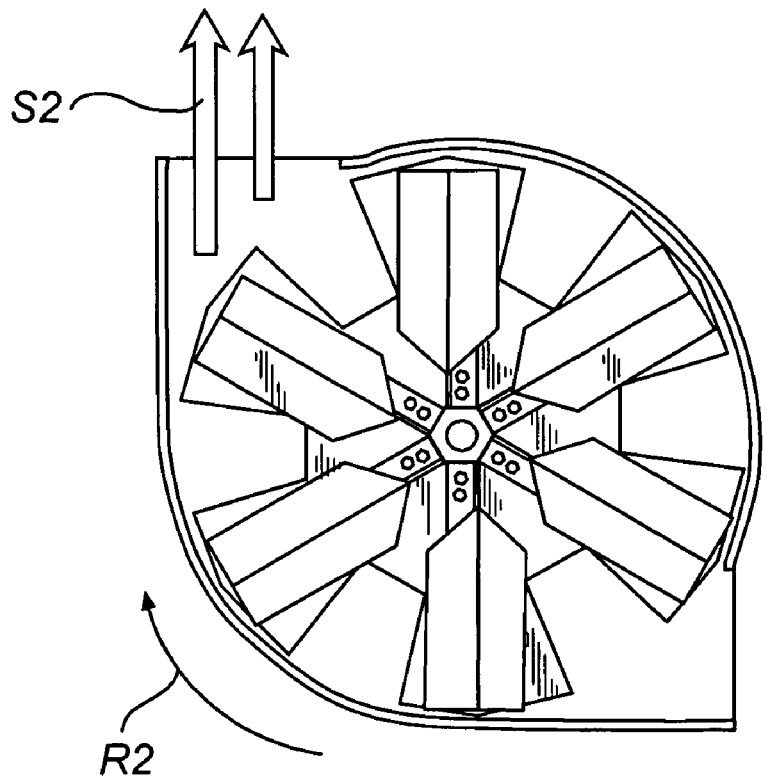
Figure 9:
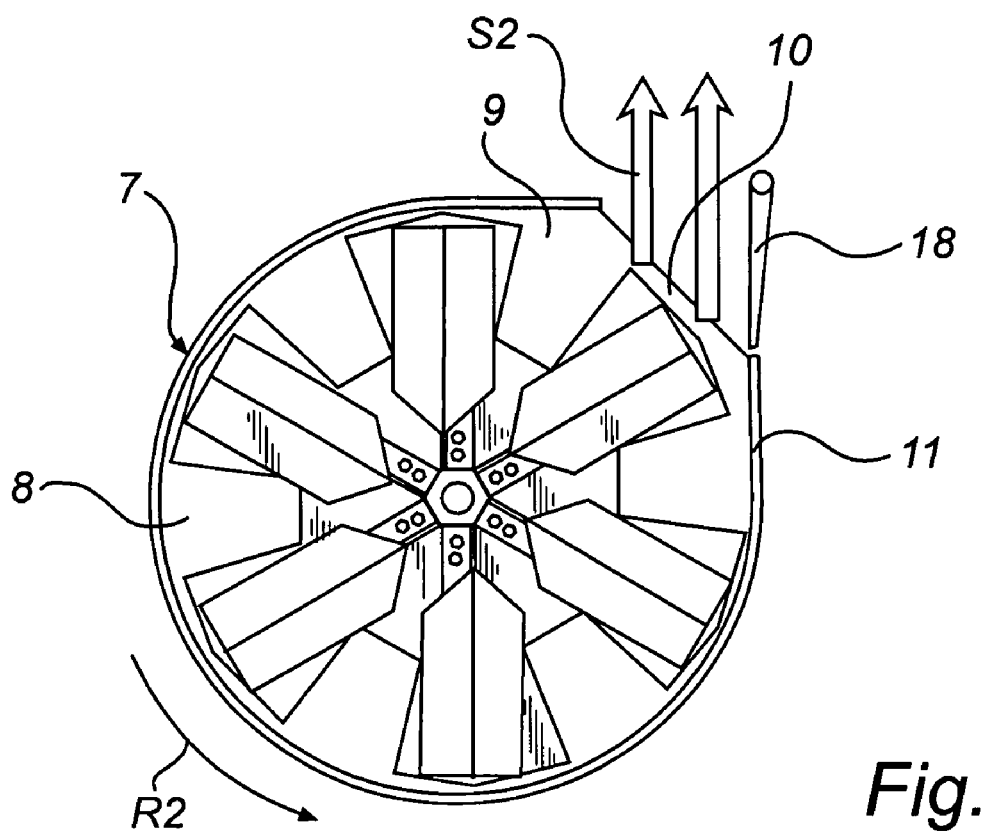
FIGS. 9 and 10 are views as seen from above of a third embodiment of the chaff discharger.
Figure 10:
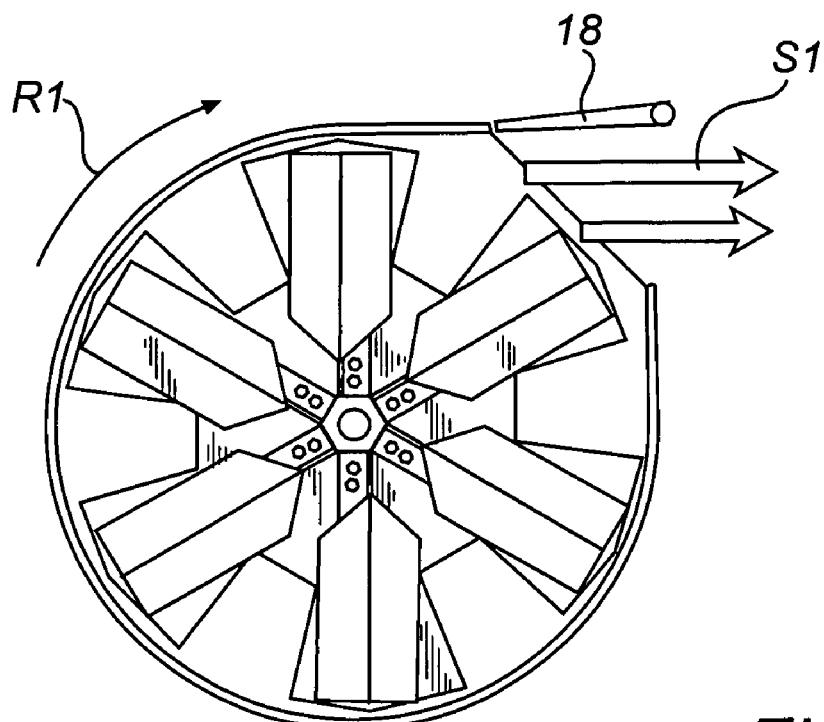
Figure 11:
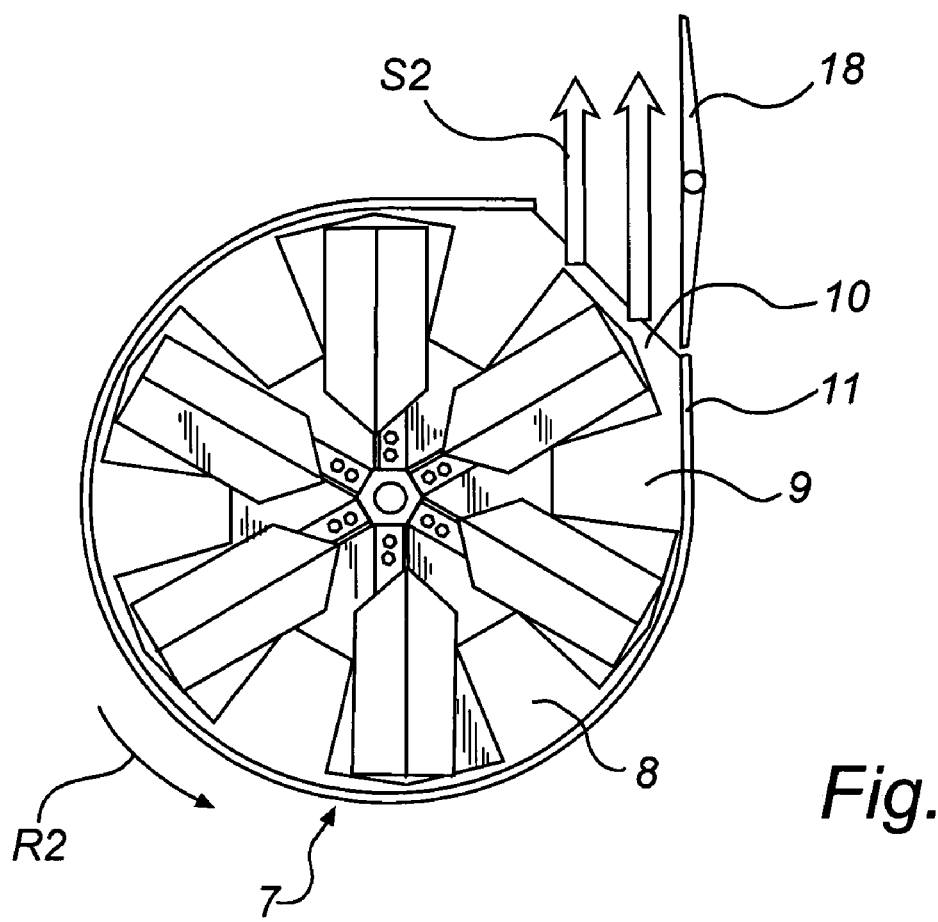
FIGS. 11 and 12 are views as seen from above of a fourth embodiment of the chaff discharger.
Figure 12:
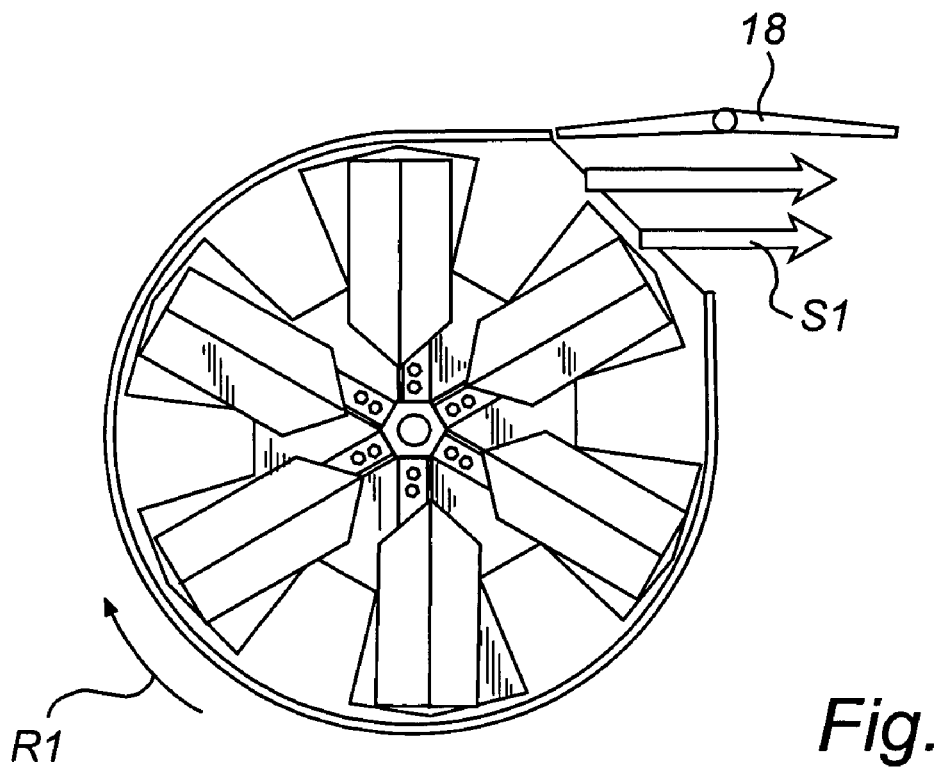
Figure 13:
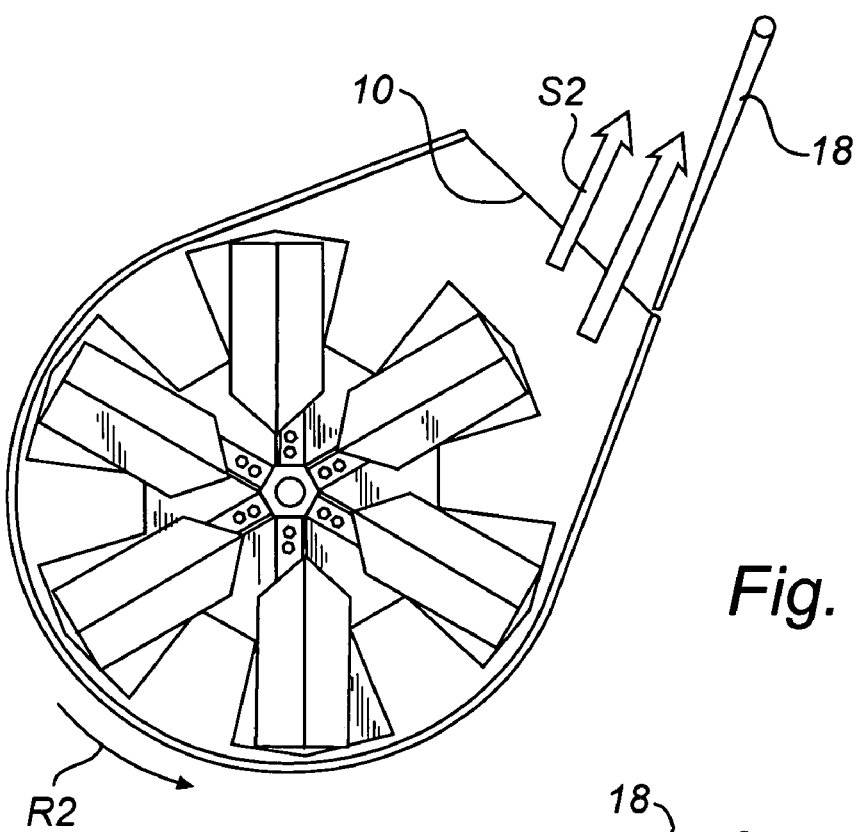
FIGS. 13 and 14 are views as seen from above of a fifth embodiment of the chaff discharger.
Figure 14:
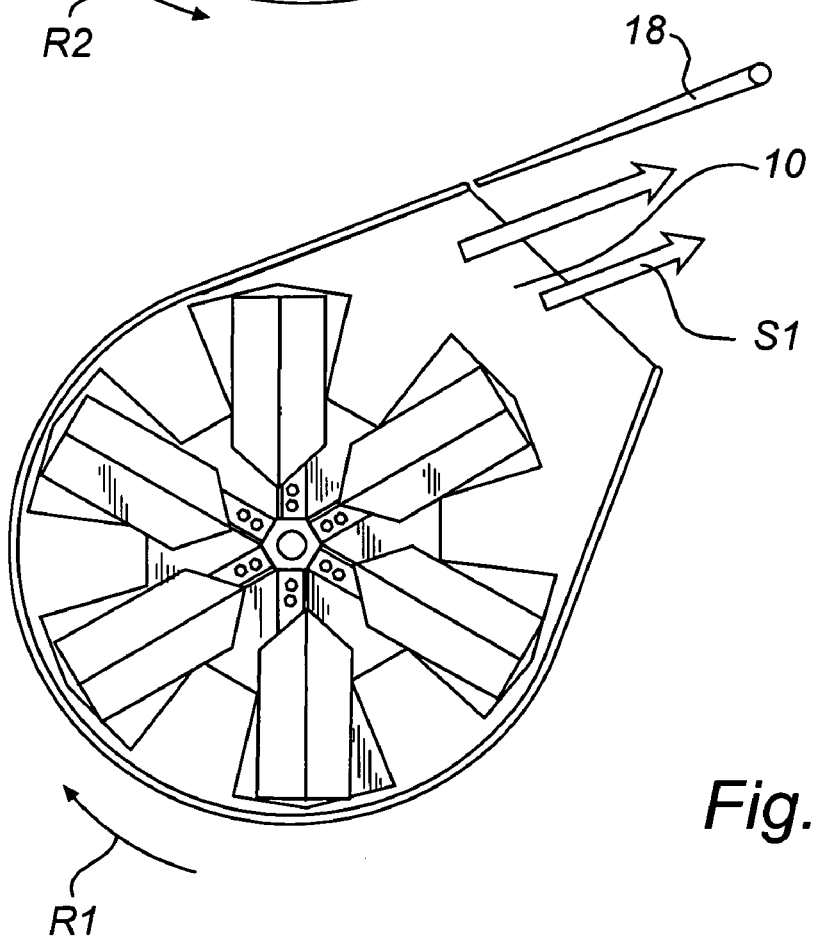
Figure 15:
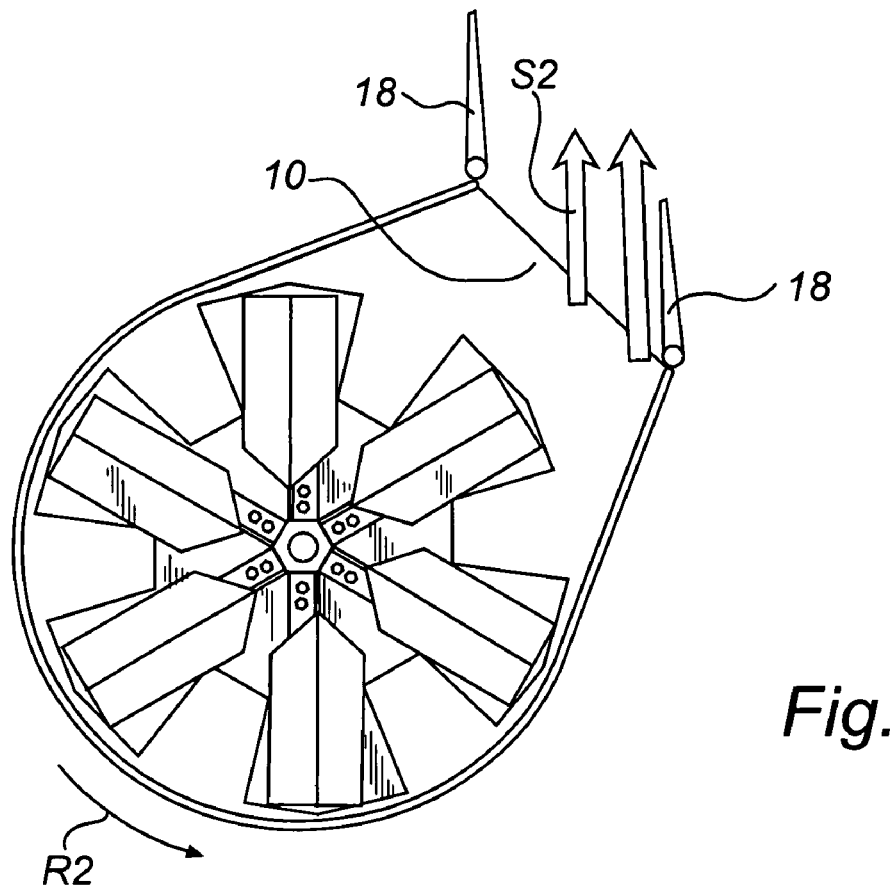
FIGS. 15 and 16 are views as seen from above of a sixth embodiment of the chaff discharger.
Figure 16:
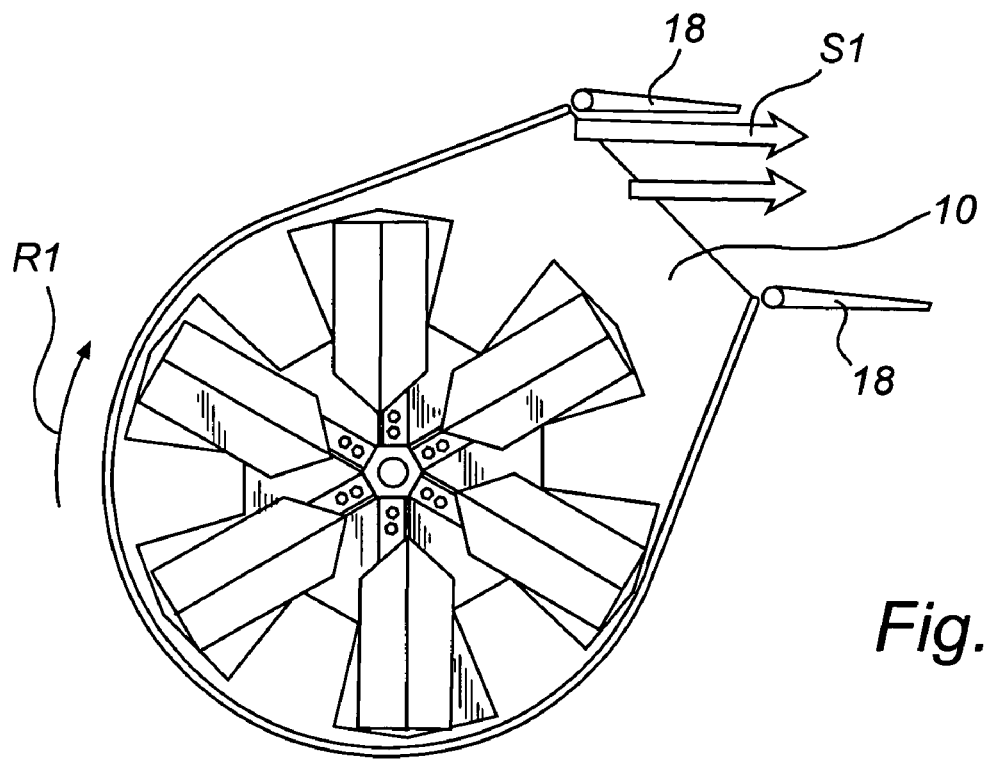

In the embodiment of the invention shown in FIGS. 7 and 8, two chaff discharge openings 10 are formed in the end wall 9, and upon rotation of the radial fan wheel 7 in rotational direction R1 one of the discharge openings discharges chaff 5 for spreading thereof across the ground 6 in direction S1 whereas the second opening is "inactive". Inversely, upon rotation of the fan wheel in the opposite direction R2, the second opening discharges chaff to be blown either into the straw chopper 3 or the spreader, depending on design, whereas the first opening remains "inactive".

In order to control the discharge of chaff 5 and the flows of air involved in this activity from the chaff discharge opening 10 in a more efficient and adjustable manner, various types of control elements 18, which may be operated manually, electrically or hydraulically or in some other manner, are provided as shown in FIGS. 9–16.

These control elements 18 could be configured as a shutter, damper or the like, which is associated with the chaff discharge opening 10 and which in a suitable manner is hingedly/pivotally connected to the chaff discharger 2 in the area of the chaff discharge opening 10. More precisely, the chutter, damper or the like preferably is rotationally mounted inside the fan housing 8 of the chaff discharger 2 essentially in parallel with the axis of rotation of the fan wheel 7 in a manner allowing it to be turned over about 90° between its two directions for control of the direction of discharge of the chaff discharge opening 10.

A complementary or alternative manner that is both simple and efficient, to control the discharge of chaff 5 from the chaff discharge opening 10 and thus vary the width of spreading thereof across the ground 6 and the feed-in/blow-in into the straw chopper 3 and the spreader, respectively, is to regulate the rotational speed of the radial fan wheel(s) 7 by means of some conventional control device, which preferably may be installed in the driver's cabin of the combine harvester 1 so as to be easily accessible to the operator.

As should be appreciated, the invention should not be regarded as limited to the embodiments and modifications thereof shown and described herein but could be varied in many ways within the scope of protection of the invention as defined in the appended claims.

The invention claimed is:

1. A chaff discharger comprising:
   at least one radial fan wheel, rotatably mounted in a fan housing, said housing including an end wall turned away from a sieving unit, and including a peripheral wall formed with at least one chaff discharge opening, wherein a direction of rotation of the radial fan wheel is reversible so as to permit discharge of the chaff in different directions via the associated chaff discharge opening, depending on the fan wheel direction of rotation.

2. A chaff discharger as claimed in claim 1, wherein the discharge of chaff in one direction results in spreading of chaff across a ground and discharge of chaff in the other direction results in admixture of chaff into unchopped straw upstream of a straw chopper.

3. A chaff discharger as claimed in claim 1, wherein on its face turned towards the sieving unit, the radial fan wheel supports ejection blades projecting from said face and on its opposite face turned towards the end wall, it supports fan blades projecting from that face, said fan wheel being formed with through recesses between its faces, serving to supply air from the face turned towards the sieving unit to the face turned towards the end wall, and wherein the ejection blades are surmounted by catch flanges extending in both directions.

4. A chaff discharger as claimed in claim 1, further comprising:
   a control element, adjacent the chaff discharge opening, for controlling the direction of discharge from said opening depending on the direction of rotation of the fan wheel.

5. A chaff discharger as claimed in claim 4, wherein the control element is configured as a shutter, which is movably arranged at the chaff discharge opening.

6. A chaff discharger of claim 1, wherein the chaff discharger is used in a combine harvester, the chaff discharger being positioned downstream of the sieving unit.

7. A chaff discharger of claim 1, wherein the chaff discharger is for discharging chaff from the sieving unit.

8. A combine harvester, comprising the chaff discharger of claim 1.

9. A combine harvester as claimed in claim 8, further comprising the sieving unit, wherein the chaff discharger is positioned downstream of the sieving unit.

10. A chaff discharger as claimed in claim 3, wherein the catch flanges are essentially at right angles to the ejection blades.

11. A chaff discharger comprising:
    a housing, including at least one chaff discharge opening; and
    means for discharging chaff, rotatably mounted in the housing,
    a direction of rotation of the means for discharging chaff being reversible so as to permit discharge of the chaff in different directions via the associated chaff discharge opening, depending on the direction of rotation.

12. A combine harvester comprising the chaff discharger of claim 11.

* * * * *